United States Patent
Sun

(10) Patent No.: US 8,081,453 B2
(45) Date of Patent: Dec. 20, 2011

(54) ADHESIVE AIR GUIDING DEVICE AND MOTHERBOARD HAVING THE SAME

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/558,578

(22) Filed: Sep. 14, 2009

(65) Prior Publication Data

US 2010/0271778 A1  Oct. 28, 2010

(30) Foreign Application Priority Data

Apr. 27, 2009 (CN) .......................... 2009 1 0301880

(51) Int. Cl.
*H05K 7/20* (2006.01)

(52) U.S. Cl. .................... 361/690; 361/679.51; 361/694; 361/695; 165/104.33; 454/184

(58) Field of Classification Search ............ 361/679.47, 361/679.54, 690, 692, 695, 697, 704, 707, 361/710, 717, 719, 679.51, 694
See application file for complete search history.

(56) References Cited

U.S. PATENT DOCUMENTS

| | | | |
|---|---|---|---|
| 4,344,106 A * | 8/1982 | West et al. ..................... 361/717 |
| 5,763,950 A * | 6/1998 | Fujisaki et al. ................ 257/712 |
| 6,545,869 B2 * | 4/2003 | Bonitz et al. ................... 361/704 |
| 6,829,149 B1 * | 12/2004 | Chang et al. ................... 361/771 |
| 7,081,691 B2 * | 7/2006 | Kawata .......................... 307/9.1 |
| 7,120,018 B2 * | 10/2006 | Shen et al. ..................... 361/695 |
| 7,204,750 B2 * | 4/2007 | Shen et al. ..................... 454/184 |
| 7,417,862 B2 * | 8/2008 | Lo ................................... 361/719 |
| 7,663,882 B2 * | 2/2010 | Li et al. .......................... 361/697 |
| 7,760,498 B2 * | 7/2010 | Shan et al. ..................... 361/695 |
| 7,760,506 B1 * | 7/2010 | Wang et al. .................... 361/709 |
| 2002/0135985 A1 * | 9/2002 | Chu et al. ....................... 361/719 |
| 2003/0196751 A1 * | 10/2003 | Huseby et al. ................ 156/289 |
| 2006/0096737 A1 * | 5/2006 | Kimura ......................... 165/80.3 |
| 2007/0274038 A1 * | 11/2007 | Sun ............................... 361/695 |

* cited by examiner

*Primary Examiner* — Courtney Smith
*(74) Attorney, Agent, or Firm* — Altis Law Group, Inc.

(57) ABSTRACT

A motherboard including an electronic component is provided. Airflow flows through the motherboard along a direction. An adhesive air guiding device including at least one air guiding surface facing the direction of the airflow is stuck to the electronic component, for guiding the airflow to flow over the electronic component.

4 Claims, 2 Drawing Sheets

ADHESIVE AIR GUIDING DEVICE AND MOTHERBOARD HAVING THE SAME

BACKGROUND

1. Technical Field

The present disclosure relates to an adhesive air guiding device, and a motherboard with the adhesive air guiding device.

2. Description of Related Art

Typically, a fan is mounted in a computer chassis to direct air from outside into the chassis, for forming airflow in a direction to cool a plurality of electronic components on a motherboard mounted on the chassis. However, most of the electronic components each have a sidewall perpendicular to the direction of the airflow, which will block the airflow and affect heat dissipation of the electronic components.

DETAILED DESCRIPTION

Figure 1:
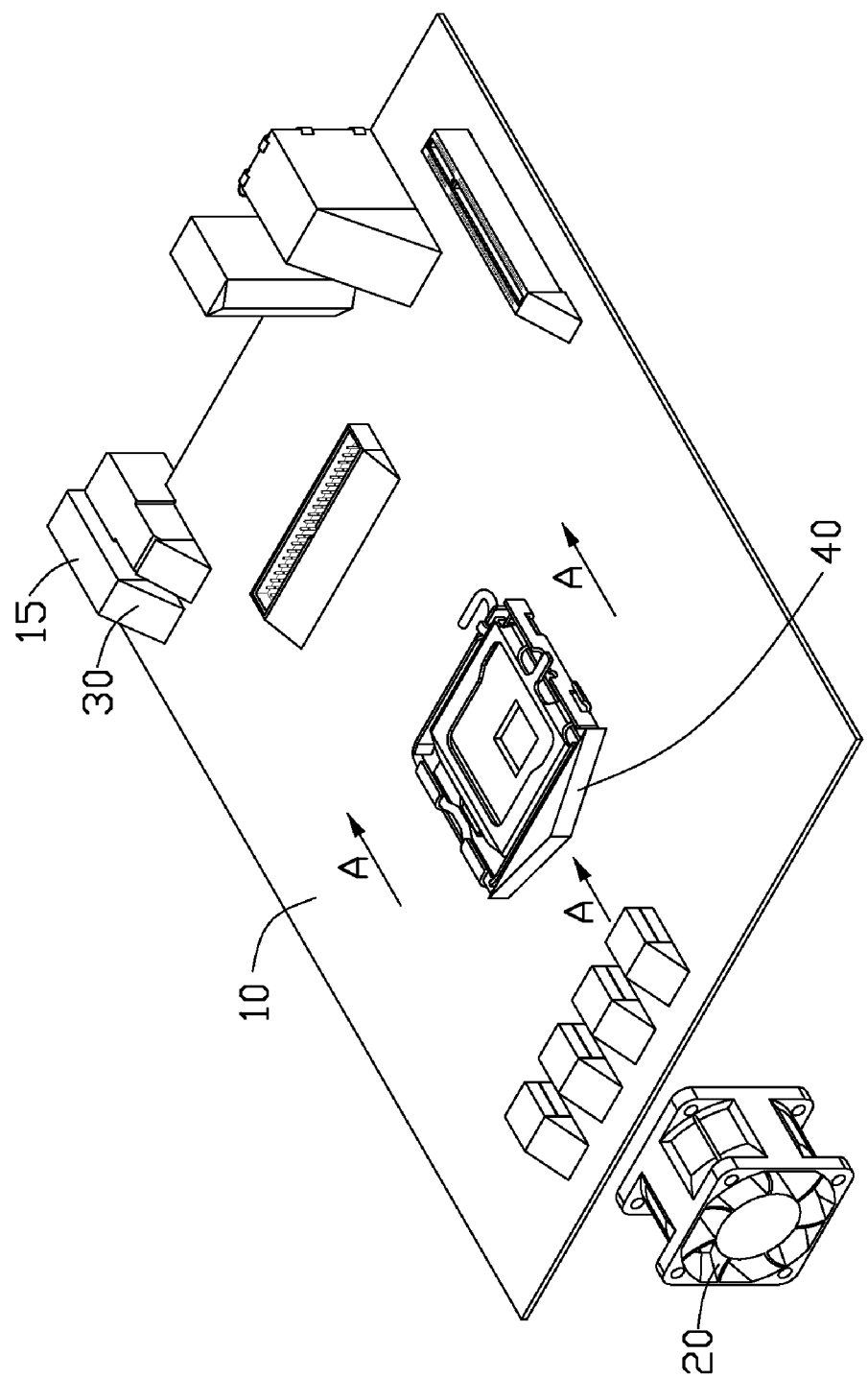
FIG. 1 is an assembled, isometric view of an embodiment of a motherboard together with a fan.
Figure 2:
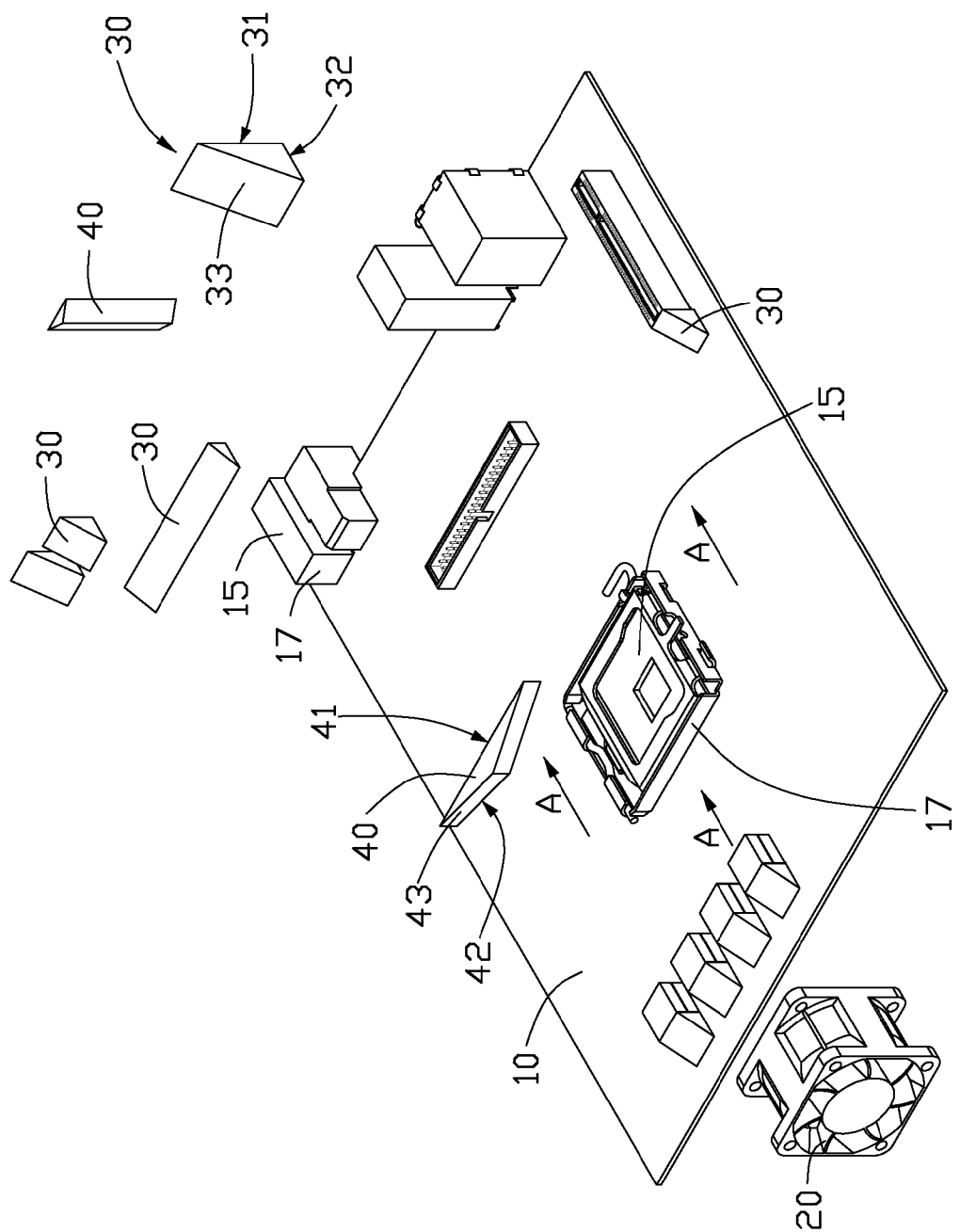
FIG. 2 is an exploded, isometric view of FIG. 1.

Referring to FIGS. 1 and 2, an embodiment of a motherboard 10 is provided. The motherboard 10 is mounted in a computer chassis (not shown), and a fan 20 is arranged in the chassis adjacent to a front edge of the motherboard 10. The fan 20 directs air from outside into the chassis to form airflow in a direction A towards the motherboard 10. A plurality of electronic components 15, such as connectors, are installed on the motherboard 10. Each of the plurality of electronic components 15 includes a sidewall 17 perpendicularly facing the airflow direction A.

A plurality of adhesive air guiding devices made of soft insulative fireresistant material are attached to the plurality of electronic components 15. The plurality of adhesive air guiding devices include first adhesive air guiding devices 30 and second adhesive air guiding devices 40 having different shapes from the first adhesive air guiding devices 30. Each of the first adhesive air guiding devices 30 is triangular-prism shaped, and includes a vertical adhesive surface 31, a bottom surface 32 perpendicularly extending from a bottom of the adhesive surface 31, and a slanted air guiding surface 33 connecting a top of the adhesive surface 31 and a front end of the bottom surface 32. The adhesive surface 31 of each first adhesive air guiding device 30 has the same shape and size as the sidewall 17 of a corresponding electronic component 15. Each of the second adhesive air guiding devices 40 is also triangular-prism shaped, and includes an rectangular adhesive surface 41, a triangular bottom surface 42 perpendicularly extending from a bottom of the adhesive surface 41, and two slanted air guiding surfaces 43 slanted extending from opposite sides of the adhesive surface 41 to connect to each other and perpendicular to the bottom surface 42. The adhesive surface 41 of each second adhesive air guiding device 30 has the same shape and size as the sidewall 17 of a corresponding electronic component 15.

In assembly, the adhesive surfaces 31 and 41 of the first and second adhesive air guiding devices 30 and 40 are correspondingly stuck to the sidewalls 17 of the corresponding electronic components 15, with the bottom surfaces 32 and 42 being supported on the motherboard 10, and the air guiding surfaces 33 and 43 facing the airflow direction A.

When the computer works, the airflow generated by the fan 20 flows towards the air guiding surfaces 33 and 43 in the direction A, and flows over the electronic components 15 along the air guiding surfaces 33 and 43. In the process, the slanted air guiding surfaces 33 and 43 can guide the airflow, and reduce windage resistance, which will enhance heat dispersion of the motherboard 10.

In this embodiment, the first and second adhesive air guiding devices 30 and 40 are made of soft insulative fireresistant material. When there are some little electronic components, such as resistors or capacitors, near the plurality of electronic components 15, the first and second adhesive air guiding devices 30 and 40 also can be assembled to the corresponding electronic components 15 with deformation.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An adhesive air guiding device comprising:
an adhesive surface;
a bottom surface substantially perpendicularly extending from a bottom of the adhesive surface; and
two air guiding surfaces slanted relative to the adhesive surface, wherein the adhesive air guiding device is made of soft insulative fire resistant material, the adhesive air guiding device is triangular-prism shaped, the air guiding surfaces connect to opposite sides of the adhesive surface and connect to each other, and the air guiding surfaces are substantially perpendicular to the bottom surface.

2. A motherboard facing an airflow flowing along a direction, the motherboard comprising:
an electronic component comprising a sidewall facing the direction of the airflow; and
an adhesive air guiding device comprising:
an adhesive surface stuck to the sidewall of the electronic component;
a bottom surface substantially perpendicularly extending from a bottom of the adhesive surface; and
two air guiding surfaces slanted relative to the adhesive surface and facing the direction of the airflow, to guide the airflow to flow over the electronic component;
wherein the adhesive air guiding device is triangular-prism shaped, the air guiding surfaces slantingly extend from opposite sides of the adhesive surface to connect to each other and are substantially perpendicular to the bottom surface.

3. The motherboard of claim 2, wherein the adhesive air guiding device is made of soft insulative fire resistant material.

4. A motherboard assembly facing an airflow flowing along a direction, the motherboard assembly comprising:
a motherboard;
an electronic component attached on a top surface of the motherboard, and comprising a sidewall facing the direction of the airflow; and
an adhesive air guiding device comprising:
a bottom surface adhered to the top surface of the motherboard;

an adhesive surface extending up from the bottom surface and adhered to the sidewall of the electronic component; and
two air guiding surfaces slantingly extending from two opposite sides of the adhesive surface to connect to each other and facing the direction of the airflow, to guide the airflow to flow over the electronic component.

* * * * *